United States Patent [19]
Tamada et al.

[11] Patent Number: 4,898,440
[45] Date of Patent: Feb. 6, 1990

[54] OPTICAL WAVEGUIDE DEVICE

[75] Inventors: Hitoshi Tamada; Masahiko Kaneko; Tsutomu Okamoto, all of Kanagawa, Japan

[73] Assignee: Sony Corporation, Tokyo, Japan

[21] Appl. No.: 244,164

[22] Filed: Sep. 14, 1988

[30] Foreign Application Priority Data

Sep. 29, 1987 [JP] Japan .............................. 62-245020

[51] Int. Cl.[4] ............................................... G02F 1/09
[52] U.S. Cl. ............................ 350/96.13; 350/96.12; 350/96.14; 350/377; 350/355
[58] Field of Search ............... 350/96.10, 96.11, 96.12, 350/96.13, 96.14, 370, 374, 375, 376, 377, 378, 355, 358, 321; 331/107 A; 333/24.1

[56] References Cited

U.S. PATENT DOCUMENTS

| | | | |
|---|---|---|---|
| 4,152,676 | 5/1979 | Morgenthaler et al. | 333/24.1 |
| 4,291,283 | 9/1981 | Castera | 331/107 A |
| 4,318,061 | 3/1982 | Castera et al. | 331/107 A |
| 4,575,179 | 3/1986 | Lee et al. | 350/96.13 |
| 4,796,983 | 1/1989 | Stancil | 350/376 |

OTHER PUBLICATIONS

Journal of Applied Physics, 50(3), Mar. 1979 "Magnetostatic wave to exchange resonance coupling[a)]", pp. 2246-2248.

Applied Physics Lett. 41(9), Nov. 1, 1982, "Optical guided-wave interactions with magnetostatic waves at microwave frequencies", pp. 779-781.

Primary Examiner—John D. Lee
Assistant Examiner—Brian M. Healy
Attorney, Agent, or Firm—Hill, Van Santen, Steadman & Simpson

[57] ABSTRACT

An optical waveguide device is disclosed which utilizes an interaction between a guided optical wave and a magnetostatic wave. The optical waveguide device comprises a layer of bismuth substituted magnetic garnet which guides an optical wave. A pair of electrodes coupled to the layer of the magnetic garnet generates a magnetostatic backward volume wave in the layer of the magnetic garnet under an application of a certain bias magnetic field. The guided optical wave and the magnetostatic wave interact with each other wherein adverse effect caused by a spin effect is avoided to realize high efficiency at high frequency.

3 Claims, 2 Drawing Sheets t = 0.635 mm    d = 8 μm    Ha = 1000 Oe
w = 100 μm    L = 6 mm

OPTICAL WAVEGUIDE DEVICE

BACKGROUND OF THE INVENTION

1. Field of the Invention

The present invention relates to an optical waveguide device that utilizes the interaction of a guided optical wave with a magnetostatic wave.

2. Description of the Prior Art

The propagation of a magnetostatic wave (MSW) in a liquid phase epitaxial grown (LPE) film of an yttrium iron garnet (YIG) and the TM⇌TE optical wave mode conversion, optical deflection, optical frequency shift or the like which is induced by the interaction of a guided optical wave with a magnetostatic wave in the film are reported, for example, in Journal of Applied Physics Vol. 50, No. 3 issued on March, 1979, PP. 2446 to 2448 and Applied Physics Letters 41(9), Nov. 1, 1982, PP. 779 to 781.

The optical waveguide device using the interaction between the magnetostatic wave and the guided optical wave can process a signal at high frequency as compared with an optical waveguide device that utilizes a surface acoustic wave. Also, the former optical waveguide device has such feature that it can be tuned depending on the magnetic field so that it is being noticed recently.

However, since specific Faraday rotation $\theta_F$ inherent in the YIG at the wavelength of 1.3 $\mu$m is as small as 0.02 deg/$\mu$m, this kind of device using the YIG presents, for example, relatively low TM⇌TE optical wave mode conversion efficiency of about 4%, for example, with a 1.7 watt input microwave power.

Since as described above in the optical waveguide device using the interaction between the magnetostatic wave and the guided optical wave through the YIG, the specific Faraday rotation of the YIG is comparatively small, the efficiency, for example, mode conversion efficiency in the mode converter is low.

To solve the above-mentioned problem, it is proposed to make an optical waveguide device by using a bismuth-substituted-magnetic garnet in which yttrium Y is substituted by a large amount of bismuth Bi and of which the specific Faraday rotation $\theta_F$ at wavelength of, for example, 1.3 $\mu$m is as high as 0.14 deg/$\mu$m as compared with the YIG. However, even the optical waveguide device using the bismuth-substituted-magnetic garnet fails to realize this kind of device having satisfactory efficiency.

OBJECTS AND SUMMARY OF THE INVENTION

It is an object of the present invention to provide an improved optical waveguide device utilizing an interaction between a guided optical wave and a magnetostatic wave.

It is another object of the present invention to provide an optical waveguide device in which a problem caused by existence of a spin wave is avoided.

It is a further object of the present invention to provide an optical waveguide device utilizing an interaction between a guided optical wave and a magnetostatic wave operable at high frequency with high efficiency.

According to one aspect of the present invention, there is provided an optical waveguide device which comprises a layer of bismuth substituted magnetic garnet, input and output means coupled to the layer of bismuth substituted garnet, a pair of electrodes coupled to the layer, and a bias magnetic field means. A magnetostatic backward volume wave is generated between the pair of electrodes, which interact with a guided optical wave in the layer of bismuth substituted garnet.

The above, and other objects, features and advantages of the present invention will become apparent from the following detailed description of the preferred embodiments to be taken in conjunction with the accompanying drawings, throughout which like reference numerals identify like elements and parts.

DESCRIPTION OF THE PREFERRED EMBODIMENTS

Figure 4:
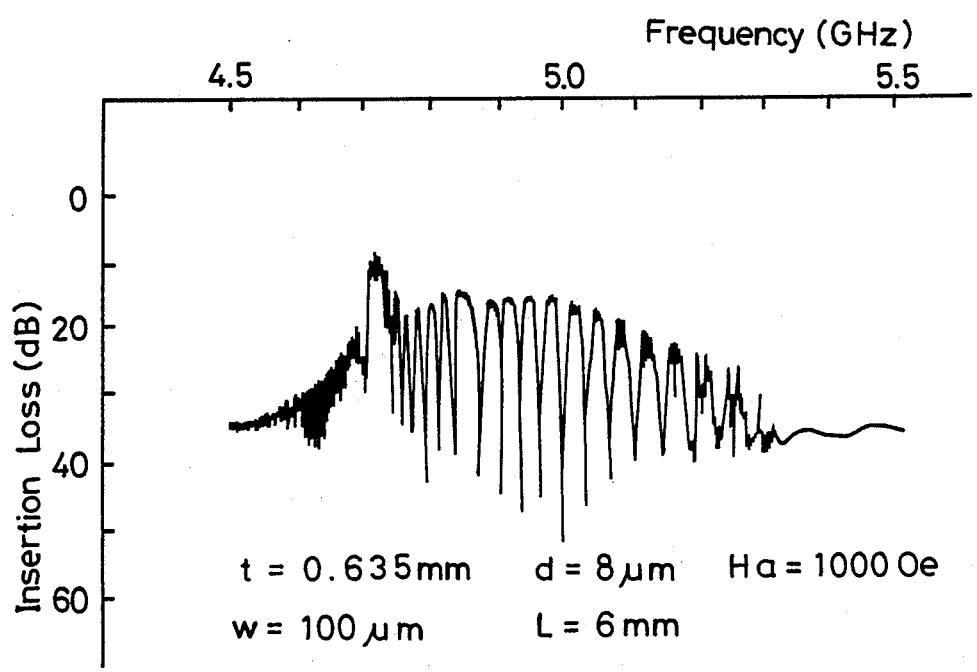
FIG. 4 is a graph of propagation characteristic of an optical waveguide device that is compared with the device of the present invention.

As a result of working on various studies, the inventors have found out that the magnetostatic wave used in the bismuth-substituted-magnetic garnet has a problem in its characteristics. By selecting the direction in which the bias magnetic field is applied, 4 kinds of magnetostatic waves such as a magnetostatic forward volume wave (MSFVW), a magnetostatic backward volume wave (MSBVW) and magnetostatic surface waves (MSSW, $S = \pm 1$) can exist. If the insertion loss vs. input frequency of the MSSW with $S = +1$, i.e., propagation characteristic of the MSSW is measured, as FIG. 4 shows, attenuation notches due to spin wave coupling are significantly apparent. In other words, the inventors have studied that when the bismuth-substituted-garnet is used, in the case of the MSSW and MSFVW, since spin wave modes simultaneously can exist in its frequency range, the coupling of the magnetostatic wave (MSW) and the spin wave easily occurs and that this coupling is a main obstacle to realize this kind of optical waveguide device. Therefore, they solve the problems and then provide an optical waveguide device for high efficiency.

Figure 1:
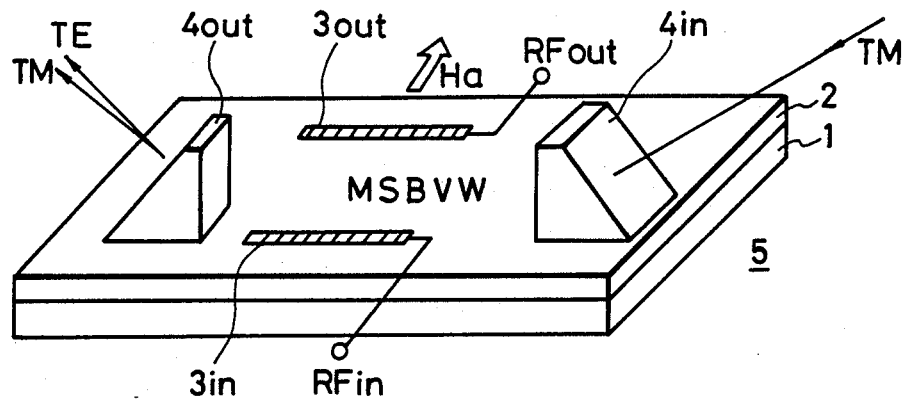
FIG. 1 is an illustration of an arrangement of an embodiment of the device according to the present invention.

As shown in FIG. 1 which is an enlarged perspective view schematically illustrating an embodiment of an optical waveguide device according to the present invention, a bismuth-substituted-magnetic garnet film 2 is grown on a substrate 1 by the liquid phase epitaxy (LPE).

This bismuth-substituted-magnetic garnet film 2 has a fundamental composition expressed as

$$(ReBi)_3Fe_5O_{12} \qquad (1)$$

where Re represents yttrium Y or one or more other rare earth elements and its bismuth substituting amount is selected higher than 0.225/f.u. (f.u. denotes formula unit). Further, in the above-mentioned equation (1), a part of Fe is substituted by one or more nonmagnetic elements such as Al, Ga and Ge. A part of Fe is further substituted by one or more divalent metal ions such as $Mg^{2+}$, $Be^{2+}$, $Sr^{2+}$, $Ba^{2+}$ and so on, and a part of the rare earth element may further be substituted with $Ca^{2+}$, thus forming the bismuth-substituted magnetic garnet film 2. This garnet film 2 has a composition in which at least divalent metal ion is added to avoid its optical absorption coefficient from being increased by the content of $Pt^{4+}$ which is taken thereinto from a platinum receptacle forming a container containing the molten material thereof and $Fe^{2+}$ formation to compensate for oxygen vacancy amount when it is formed by the LPE.

Microwave input and output electrodes 3in and 3out are disposed in contact with or in opposing relation to one major face, i.e., surface of the magnetic garnet film 2. Means (not shown) is provided to apply a bias magnetic field in the direction parallel to the major face, i.e., film plane of the magnetic garnet film 2 and also in the arranging direction of the input and output electrodes 3in and 3out, for example, in the direction from the input electrode 3in to the output electrode 3out or vice versa, and in the figure, a bias magnetic field Ha in the direction from the input electrode 3in to the output electrode 3out to produce a magnetostatic backward volume wave MSBVW between both the electrodes 3in and 3out.

An optical input conversion portion 4in, which takes in a light so as to interact with the magnetostatic backward volume wave MSBVW generated between the input and output electrodes 3in and 3out, and an optical output conversion portion 4out are respectively disposed on the magnetic garnet film 2.

According to the thus arranged device of the present invention, since the bismuth-substituted-magnetic garnet film 2 inherently having a large specific Faraday rotation $\theta_F$ is used and attenuation notches due to the spin wave coupling can be avoided by the employment of the magnetostatic backward volume wave which cannot theoretically coexist with the spin wave mode, it is possible to increase the efficiency of the interaction between the magnetostatic wave and the guided optical wave.

Figure 2:
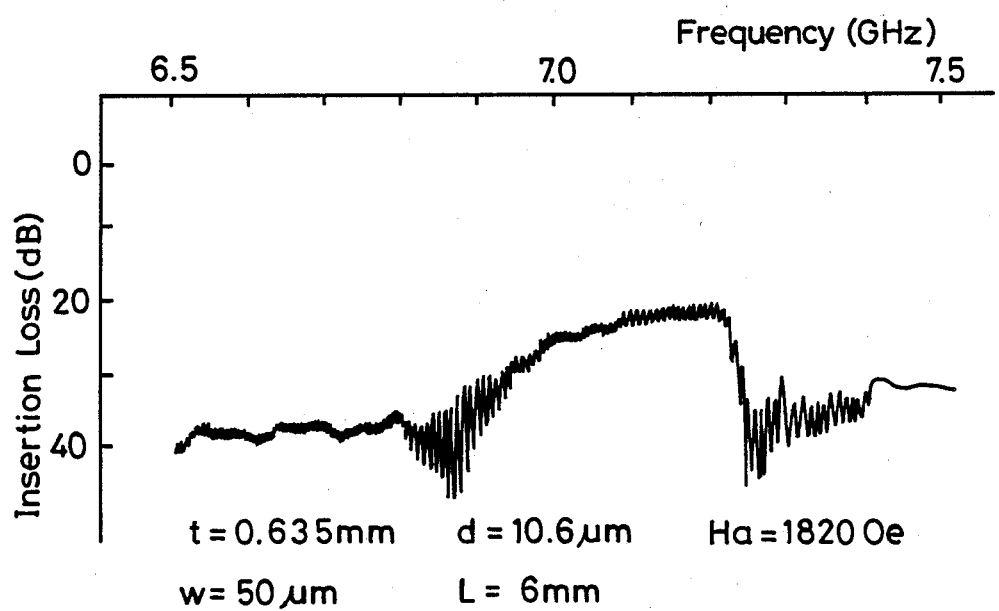
FIG. 2 is a graph used to explain its characteristics.

FIG. 2 illustrates measured results of the insertion loss of the input microwave versus its frequency in the bismuth-substituted-magnetic garnet film. The comparison thereof with FIG. 4 reveals that the attenuation notches due to the spin wave coupling are improved. The characteristics of FIG. 2 were measured under such conditions that a distance t between the magnetic garnet film plane and the ground surface was 0.635 mm, the film thickness d was 10.6 μm, the D.C. bias magnetic field Ha was 1820 Oe, the width w of each of the microstrip lines for forming the input and output electrodes 3in and 3out was 50 μm and the propagation length L was 6 mm. The characteristics of FIG. 4 were measured under such condition that t=0.635 mm, d=8 μm, Ha=1000 Oe, w=100 μm and L=6 mm.

Figure 3:
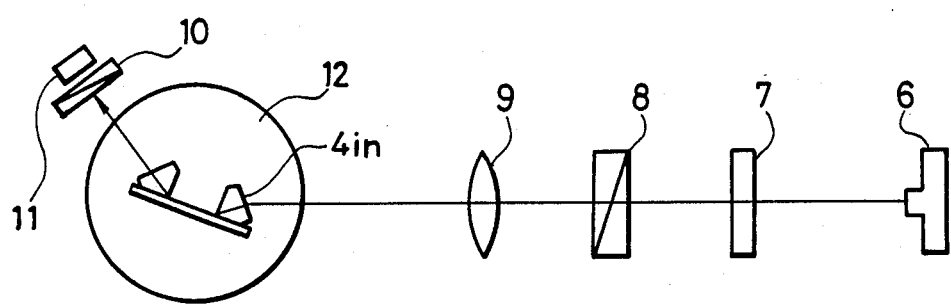
FIG. 3 is an illustration of an arrangement of an example of a TM⇌TE optical wave mode conversion apparatus.

The application of the present invention to the TM⇌TE optical wave mode conversion apparatus will be described. As shown in FIG. 1, the bismuth-substituted-magnetic garnet film 2 made of $(LuBi)_3(FeMg)_5O_{12}$ and having the thickness d=10.6 μm was grown on the substrate 1 made of a gadolinium gallium garnet (GGG) by the liquid phase epitaxy. On the bismuth-substituted-magnetic garnet film 2, the input and output electrodes 3in and 3out formed of a pair of microstrip lines each having the width w=50 μm were deposited with a distance L=6 mm in opposing and parallel relation to each other. On sides of the arrangement of these electrodes 3in and 3out, the optical input and output converting portions 4in and 4out, each being formed of, for example, a GaP prism were disposed to propagate the optical wave along a line inclined by a predetermined angle, for example, several degrees relative to a propagation direction of the magnetostatic wave so as to oppose to each other. Reference numeral 5 denotes an overall arrangement of the thus made optical waveguide device, namely, the optical wave mode conversion device in this embodiment. As FIG. 3 shows, a TE mode wave emitted from a light source 6, that is formed of a laser diode of which the wavelength is, for example, 1.317 μm, is converted through a λ/2 wavelength plate 7 into a TM mode wave. This latter wave is introduced through a polarizing plate 8 and also through a lens system 9 to the input converting portion 4in of the optical waveguide device 5, thereby to introduce this light to bismuth-substituted-magnetic garnet film. Meanwhile, at that time, as described before, the optical waveguide device 5 is applied with the bias magnetic field Ha and a predetermined microwave is introduced between both the input and output electrodes 3in and 3out to produce a magnetostatic backward volume wave MSBVW therebetween, by which the TM mode wave introduced into the optical waveguide device 5 is modulated and separated into a TE mode wave and a TM mode wave. They are then derived from the output converting portion 4out. The wave is supplied through an analyzing plate 10 to a detector 11, i.e., photo-electric conversion element thereby to detect the light which is converted to the TE mode wave. Reference numeral 12 denotes a rotation platform on which the optical waveguide device 5 is supported to select an angle for the incident light.

While in the above embodiment the present invention is applied to the conversion apparatus which converts the introduced TM mode wave into the TE mode wave, the present invention can also be applied to a conversion apparatus which converts the TE mode wave into the TM mode wave.

Further, while in the above embodiment the present invention is applied to the TM⇌TE optical wave mode conversion apparatus, the present invention can also be applied to an optical frequency shifter that receives a light of, for example, a predetermined frequency $\omega_0$ and then delivers light of a frequency $\omega 1$ by the interaction of the former with the magnetostatic volume wave. Furthermore, the present invention can be applied, for example, to an optical switching element, an optical deflector and so on. In addition, the following operation modes are possible. By fixing the frequency of the microwaves applied between the electrodes 3in and 3out, the inputted light is subjected fixedly to the TM⇌TE optical wavemode conversion, frequency-shifting or deflection. Further, a light is modulated by frequency-modulating the microwave or conversely an electrical signal from the output electrode 3out is modulated by controlling the light. The using modes and structures of the present invention can take various modifications and variations.

According to the device of the present invention, since the bismuth-substituted-magnetic garnet film having large specific Faraday rotation $\theta_F$ is used and the mutual interaction with the magnetostatic backward volume wave free from the generation of the spin mode is used, the optical waveguide device with high mode conversion efficiency, for example, the optical wave mode converter, the optical deflector, the optical frequency shifter and so on can be realized with significant effects being achieved in practice.

It should be understood that the above description is presented by way of example on the preferred embodiments of the invention and it will be apparent that many modifications and variations thereof could be effected by one with ordinary skill in the art without departing from the spirit and scope of the novel concepts of the invention so that the scope of the invention should be determined only by the appended claims.

We claim as our invention:

1. An optical waveguide device comprising:
   (a) a layer of bismuth substituted magnetic garnet having a major surface;
   (b) a pair of electrodes provided on said major surface applied with a microwave;
   (c) means for applying a bias magnetic field in parallel to said major surface along a direction from one electrode to another electrode;
   (d) optical input and output portions coupled to said layer to guide an optical wave therebetween, wherein said optical wave interacts with a magnetostatic backward volume wave generated by application of a microwave to said pair of electrodes with said bias magnetic field; and wherein said bismuth substituted magnetic garnet contains not less than 0.225 formula unit of Bi.

2. An optical waveguide device according to claim 1, wherein said layer of bismuth substituted magnetic garnet is formed on a nonmagnetic GGG substrate by liquid phase epitaxial growth.

3. An optical waveguide device comprising:
   (a) a layer of bismuth substituted magnetic garnet having a major surface;
   (b) a pair of electrodes provided on said major surface applied with a microwave;
   (c) means for applying a bias magnetic field in parallel to said major surface along a direction from one electrode to another electrode;
   (d) optical input and output portions coupled to said layer to guide an optical wave therebetween, wherein said optical wave interacts with a magnetostatic backward volume wave generated by application of a microwave to said pair of electrodes with said bias magnetic field; and wherein said layer of bismuth substituted magnetic garnet is $(LuBi)_3(FeMg)_5O_{12}$.

* * * * *